United States Patent
Wang et al.

(10) Patent No.: US 9,827,707 B2
(45) Date of Patent: Nov. 28, 2017

(54) SYSTEMS AND METHODS FOR JOINING POLYMERIC COMPOSITES USING CONDUCTIVE INK AND A CONDUCTIVE RIVET

(71) Applicant: GM GLOBAL TECHNOLOGY OPERATIONS LLC, Detroit, MI (US)

(72) Inventors: Pei-Chung Wang, Troy, MI (US); Chen-Shih Wang, Troy, MI (US); Yongqiang Li, Rochester, MI (US); Saul Lee, Franklin, MI (US); Hamid Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 773 days.

(21) Appl. No.: 14/453,764

(22) Filed: Aug. 7, 2014

(65) Prior Publication Data

US 2015/0053328 A1    Feb. 26, 2015

Related U.S. Application Data (60) Provisional application No. 61/863,472, filed on Aug. 8, 2013.

(51) Int. Cl.
*B29C 65/60*    (2006.01)
*B29C 65/34*    (2006.01)
(Continued)

(52) U.S. Cl.
CPC ........ *B29C 65/3468* (2013.01); *B29C 65/562* (2013.01); *B29C 65/603* (2013.01);
(Continued)

(58) Field of Classification Search
CPC .............................. B29C 65/3468; B29C 65/60
See application file for complete search history.

(56) References Cited

U.S. PATENT DOCUMENTS

| 4,556,439 | A | 12/1985 | Bannink, Jr. | |
|---|---|---|---|---|
| 2005/0133483 | A1* | 6/2005 | Hou | B23K 11/0066 |
| | | | | 219/118 |
| 2012/0019973 | A1* | 1/2012 | Ehrmantraut | B64D 45/02 |
| | | | | 361/218 |

FOREIGN PATENT DOCUMENTS

| CN | 07214338 | 8/1995 |
|---|---|---|
| DE | 102004025492 | 8/2009 |

OTHER PUBLICATIONS

German Office Action issued by the German Patent Office dated May 12, 2015 for related German Patent Application No. 10 2014 111 257.1.

* cited by examiner

*Primary Examiner* — Jeff Aftergut
*Assistant Examiner* — Jaeyun Lee
(74) *Attorney, Agent, or Firm* — Mickki D. Murray; Parks IP Law LLC (57) ABSTRACT

A process, for joining workpieces using hybrid mechanical connector-resistance welding. The process in some embodiments includes introducing a conductive fluid to an interface between the workpieces. The process also includes inserting at least one mechanical conductive connector into at least one of the workpieces so that the connector reaches the interface having the conductive fluid therein. The process in some embodiments includes further applying energy for welding to the at least one mechanical conductive connector so that the energy passes, through the connector, to the conductive fluid and heat is generated in the workpieces at the interface, thereby melting the workpieces and forming a weld joint connecting the workpieces.

20 Claims, 5 Drawing Sheets

(51) Int. Cl.
*B29C 65/56* (2006.01)
*B29C 65/72* (2006.01)
*B29C 65/00* (2006.01)
B29C 65/08 (2006.01)
B29L 31/30 (2006.01)

(52) U.S. Cl.
CPC .......... *B29C 65/72* (2013.01); *B29C 66/1122* (2013.01); *B29C 66/21* (2013.01); *B29C 66/43* (2013.01); *B29C 66/7392* (2013.01); *B29C 66/81431* (2013.01); *B29C 66/81871* (2013.01); *B29C 66/8322* (2013.01); B29C 65/08 (2013.01); B29C 66/71 (2013.01); B29C 66/712 (2013.01); B29C 66/721 (2013.01); B29C 66/7212 (2013.01); B29C 66/742 (2013.01); B29C 66/949 (2013.01); B29L 2031/3055 (2013.01)

SYSTEMS AND METHODS FOR JOINING POLYMERIC COMPOSITES USING CONDUCTIVE INK AND A CONDUCTIVE RIVET

TECHNICAL FIELD

The present disclosure relates generally to joining polymeric composites and, more particularly, to systems and methods for joining composites using conductive ink and a conductive rivet.

BACKGROUND

Vehicles are being manufactured increasingly to include plastics and other polymers in place of traditional materials, such as metal. Polymers, such as fiber-reinforced polymers (FRP) are generally lighter and can have comparable strength. They can also be shaped, textured, and colored as desired more easily.

The increased use in automobiles can include, for instance, in instrument and door panels, lamps, air ducts, steering wheels, upholstery, truck beds or other vehicle storage compartments, upholstery, and even engine components.

The increased use in automobiles includes, for instance, in instrument and door panels, lamps, air ducts, steering wheels, upholstery, truck beds or other vehicle storage compartments, upholstery, external parts, and even engine components. Regarding engine components, and other under-the-hood (or, UTH) applications, for instance, polymers are configured, and being developed continuously, that can withstand a hot and/or chemically aggressive environment. Regarding external parts, such as fenders, polymers are being developed that are online paintability and have high heat and chemical resistance over longer periods of time. And many other potential usages in automotive applications are being considered continuously.

With this trend, finding ways to efficiently and effectively assemble and join polymer components is becoming progressively important.

One way to join thermoplastic polymers, especially two dissimilar polymers, is using ultrasonic welding. In this technique, high-frequency ultrasonic acoustic vibrations are applied to two polymer components. The vibrations are applied, while the components are held together under pressure, to create a fusion weld.

Shortcomings of conventional ultrasonic welding include those related to an amount of energy required. One of these challenges is undesirable cycle time. A range from about twelve to about twenty seconds, or more, is usually required, for instance.

For conventional two-sided welding processes, another of these shortcomings is a need to access the workpieces from opposing sides, which may not be feasible due to environmental constraints in production.

SUMMARY

The present technology relates to a hybrid rivet-resistance welding technique. The technique involves applying a conductive fluid, such as a conductive ink, to at least one of the workpieces being joined—e.g., between the pieces, where the joint is to be formed. A mechanical conductive connector, such as a staple rivet, is embedded into a first of the workpieces being joined, at least to a distance by which the connector reaches the conductive fluid. In some embodiments the rivet is sized and shaped to extend to a second of the workpieces being joined when inserted.

An electrical current is then applied to the conductive ink by way of the rivet, producing joule heat to weld the workpieces together.

Other aspects of the present invention will be in part apparent and in part pointed out hereinafter.

The figures are not necessarily to scale and some features may be exaggerated or minimized, such as to show details of particular components. In some instances, well-known components, systems, materials or methods have not been described in detail in order to avoid obscuring the present disclosure.

Therefore, specific structural and functional details disclosed herein are not to be interpreted as limiting, but merely as a basis for the claims and as a representative basis for teaching one skilled in the art to variously employ the present disclosure.9

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

I. General Overview of the Disclosure

The present technology provides a hybrid rivet-resistance welding technique for joining two components, or workpieces.

As provided, the workpieces being welded together can be similar or dissimilar. Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymer composite) to another polymer, or to join a polymer to a metal, for instance.

In one embodiment, the material includes polyethylene. In one embodiment, the material includes polyethylene terephthalate (PET), high density polyethylene (HDPE) and/or ethylene vinyl alcohol (EVOH).

In one embodiment, at least one of the workpieces being joined includes a polymer. At least one of the workpieces can include synthetic, or inorganic, molecules. While use of so-called biopolymers (or, green polymers) is increasing, petroleum based polymers are still much more common.

Material of one or both workpieces may also include recycled material, such as a polybutylene terephthalate (PBT) polymer, which is about eighty-five percent post-consumer polyethylene terephthalate (PET).

In one embodiment one or both of the workpieces includes some sort of plastic. In one embodiment, the material includes a thermo-plastic.

In one embodiment one or both of the workpieces includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material in some implementations includes a polyamide-grade polymer, which can be referred to generally as a polyamide.

Material of one or both workpieces may also include includes polyvinyl chloride (PVC).

In one embodiment, the material includes acrylonitrile-butadiene-styrene (ABS).

In one embodiment, the material includes a polycarbonate (PC).

Material of one or both workpieces may also comprise a type of resin. Example resins include a fiberglass polypropylene (PP) resin, a PC/PBT resin, and a PC/ABS resin.

The workpieces may be pre-processed, such as heated and compression molded prior to the welding.

The process involves applying a conductive fluid, such as a conductive ink, to at least one of the workpieces—e.g., between the workpieces, being joined, where the joint is to be formed. A conductive connector, such as a staple rivet or other mechanical conductive implement, is embedded into a first of the workpieces being joined, at least to a distance by which the connector reaches the conductive fluid.

Electrical current is then applied to the rivet using an electrode. The current passes into a first portion of the rivet by way of a first (e.g., positive) electrode and on to the conductive ink. The ink completes a circuit loop including a second portion of the rivet leading up to a second (e.g., negative) electrode.

The current passing through the ink produces joule heat in the rivet, ink, and the workpieces adjacent the ink and rivet. The joule heat melts the workpieces at the joint, thereby joining the workpieces together.

The system and method of operation are described in further detail below.

II. System Components—FIG. 1

Figure 1:
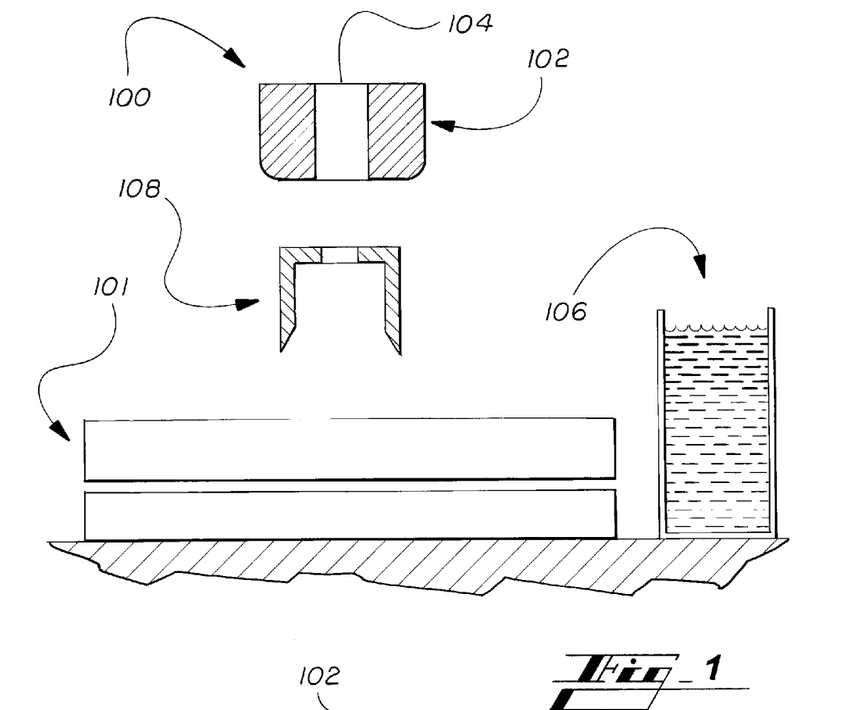
FIG. 1 is a cross-sectional view of a system and two workpieces to be joined by the system, according to an embodiment of the present disclosure.

Now turning to the figures, and more particularly to the first figures, FIG. 1 shows, by cross-sectional view, aspects of a resistance welding system. There, the system is indicated by reference numeral 100. The system 100 is used to join together two or more workpieces, or components, given reference numerals 101.

The system 100 includes an electrode arrangement 102. In one embodiment, the system 100 includes a punch 104. The punch 104 can be at least initially connected to, encapsulated in, or otherwise positioned adjacent, the electrode arrangement 102, as shown in FIG. 1. More particularly, as shown, in one embodiment, the electrode and electrode are sized and shaped so that the punch can be slidably received in a central cavity of the electrode, as shown in FIG. 1.

The system 100 also includes a conductive fluid 106, such as a conductive ink. The conductive fluid can have any desired material and qualities, such as density, consistency, viscosity, and conductivity. Density, consistency, and viscosity can affect, for instance, how thickly the fluid can be applied, and/or maintained, between the parts. How thickly the fluid can be maintained can also be effected by physical factors existing between the workpieces, such as pressure (e.g., presence of any vacuum or negative pressure) and adhesion, such as surface adhesion by which the fluid may extend after contacting one or both of opposing surfaces of the workpieces.

The system 100 further includes a conductive connector 108, such as a staple rivet or other mechanical implement. The connector 108 is referred to as such because it connects the electrode to the conductive fluid 106 after the fluid has been applied to the workpieces 101 being joined. The term may also refer to a connecting function the feature 108 performs following the joining process—i.e., providing a secondary mechanical connection, as a back up to the welded connection.

The workpieces 101 can include similar or dissimilar materials compared to each other. Example materials for the workpieces 101 include, but are not limited to, carbon-fiber-reinforced polymer (CFRP) composites, a very strong and light FRP. Other types of fiber that can be embedded into polymeric composites joined include glass—i.e., GFRP.

III. Electrode in More Detail—FIG. 2

Figure 2:
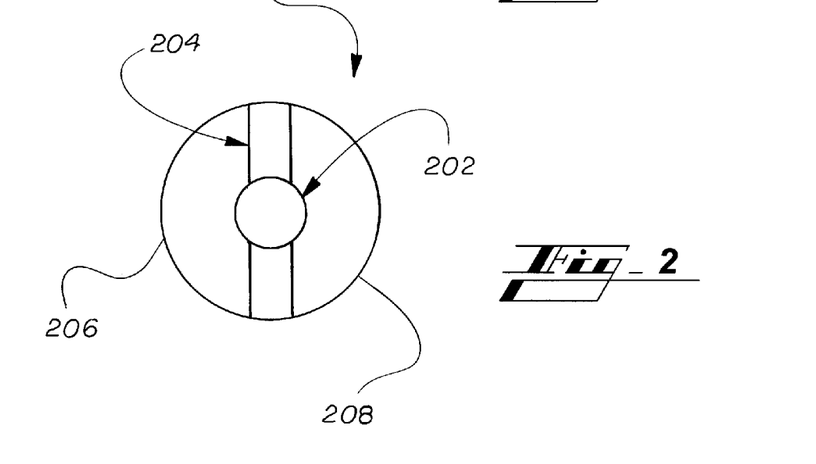
FIG. 2 is a top plan view of an electrode of the system shown in FIG. 1.

FIG. 2 is a top plan view of the example electrode arrangement 102, shown in FIG. 1. The electrode arrangement 102 may have a generally circular top profile, as shown, and a central void 202. As provided the void 202 can be sized and shape to receive the punch 104, which is not shown in FIG. 2.

In the embodiment shown, the electrode arrangement 102 includes an insulating portion 204. The insulating part 204 is shown bisecting first and second electrodes 206, 208, or electrode poles. In operation, current is passed through the first electrode 206, through a first part of the conductive connector 108, through the conductive fluid 106, and back up to the second electrode 208, via a second part of the connector 108, to complete the electrical loop. The current passing through the loop creates the target joule heating condition for melting the workpieces together at the interface between the pieces, thereby created a welded joint.

Figures 10, 11:
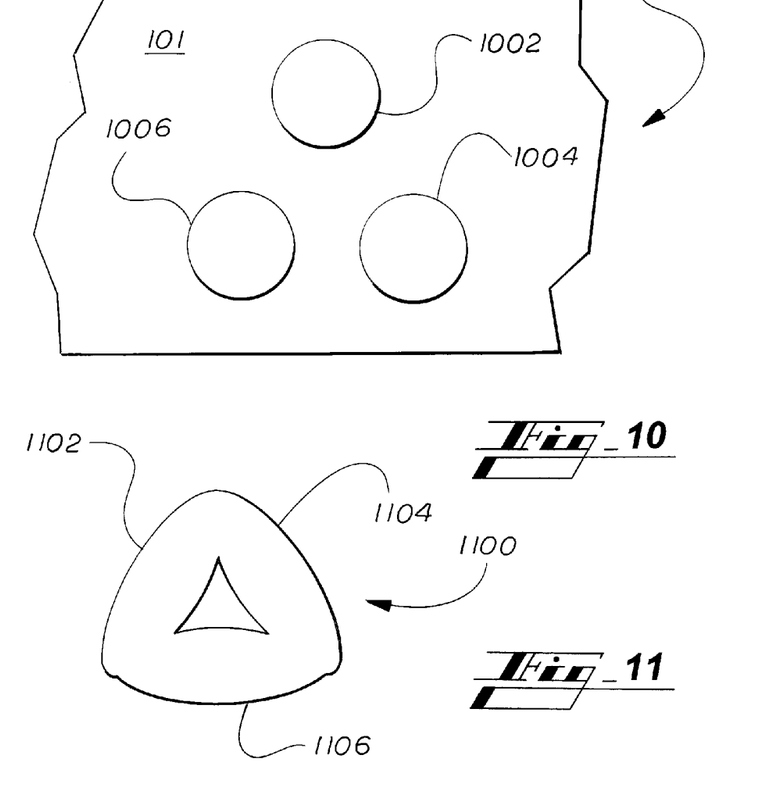
FIG. 10 illustrates an example electrode arrangement that can be used in combination with the connector arrangement of FIG. 9, according to an embodiment of the present technology.
FIG. 11 illustrates an example weld arrangement resulting from use of the connector and electrode arrangements of FIGS. 9 and 10.

As with all elements described herein, the electrode arrangement 102 is not limited to the shape or configuration shown. The electrode arrangement 102 can in some implementations have a non-circular top profile shape, for instance. In one contemplated embodiment, the electrode arrangement 102 includes two non-connected electrodes, obviating the need for an intervening insulator (reference, e.g., FIG. 10, showing non-connected electrodes).

IV. Method of Operation—FIG. 3, with reference to FIGS. 4-8

Figure 3:
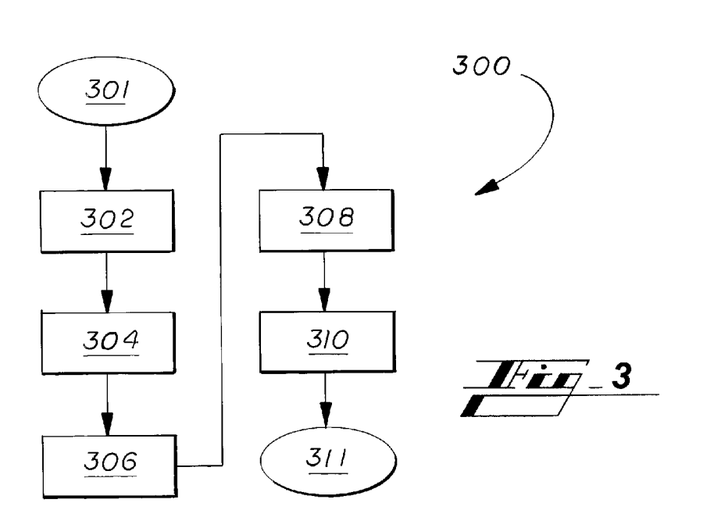
FIG. 3 illustrates a method for implementing the present technology.

FIG. 3 shows an exemplary method 300 for welding together multiple components, such as polymeric-composite workpieces. While joining two workpieces 101 is described primarily herein, the description is by way of example, as more than two pieces may be joined according to the teachings of the present disclosure.

As provided, the workpieces 101 can be similar or dissimilar. In one embodiment, at least one of the workpieces 101 is a fiber-reinforced polymer (FRP) composite, such as a carbon-fiber-reinforced polymer (CFRP), or a glass-FRP (GFRP).

It should be understood that the steps of the method 300 are not presented necessarily in any particular order, and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated method 300 can be ended at any time. In certain embodiments, some or all steps of this process, and/or substantially equivalent steps are performed by or at least initiated by a computing device, such as a processor executing computer-executable instructions stored or included at a computer-readable medium. And any one or more steps of the process can be performed by automated machinery, such as by robotics.

The method 300 begins at oval 301, and flow proceeds to block 302, whereat a conductive fluid (e.g., the fluid 106 shown in FIG. 1) is applied on a surface of at least one of the workpieces—e.g., between the workpieces, being joined.

Figure 4:
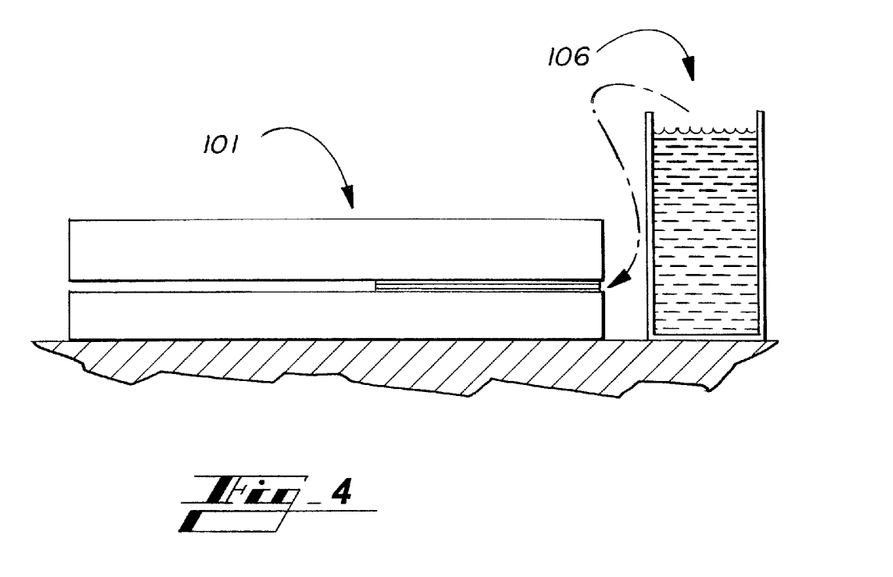
FIG. 4 illustrates the system and workpieces, of FIG. 1, at a first select stage of processing.

The act of step 302 is schematically in FIG. 4. The conductive fluid can be applied before the workpieces are positioned adjacent each other. The fluid can be applied in any appropriate manner, such as by nozzle dispensing or spraying, brushing, etc.

And any appropriate amount of the conductive fluid can be applied. In one embodiment, the fluid is applied in a manner, including in an amount, ensuring that the fluid is provided continuously between the workpieces where welding is desired.

At step 304, a mechanical, conductive connector (e.g., staple rivet 108) is provided into at least the first of the workpieces 101. In one embodiment, the connector is positioned within the first workpiece prior to insertion of the conductive fluid (step 302). This embodiment is described further below.

In another embodiment, once the workpieces are positioned adjacent each other with the conductive ink in place between them as desired, flow of the method 300 proceeds to step 304, whereat the mechanical, conductive connector (e.g., staple rivet 108) is inserted into at least one of the workpieces (101) and to extend to the conductive fluid. In one embodiment, a punching tool (e.g., punch 104) is used to force the connector into at least the first of the workpieces and to extend to the conductive fluid.

The piercing is in one implementation performed while welding energy (e.g., HF ultrasonic vibrations), and force, are being applied, by a welding tool, to the connector. The energy causes the first workpiece 101 to melt adjacent tips of the connector, facilitating the piercing.

As provided, in one embodiment, the connector is positioned within the first workpiece prior to insertion of the conductive fluid (step 302). The step can include, e.g., positioning the conductive mechanical connector in the first workpiece prior to or during a molding process for the first workpiece. The connector may be, for instance, implanted or embedded into the first workpiece during compression molding for the first workpiece.

Figure 7:
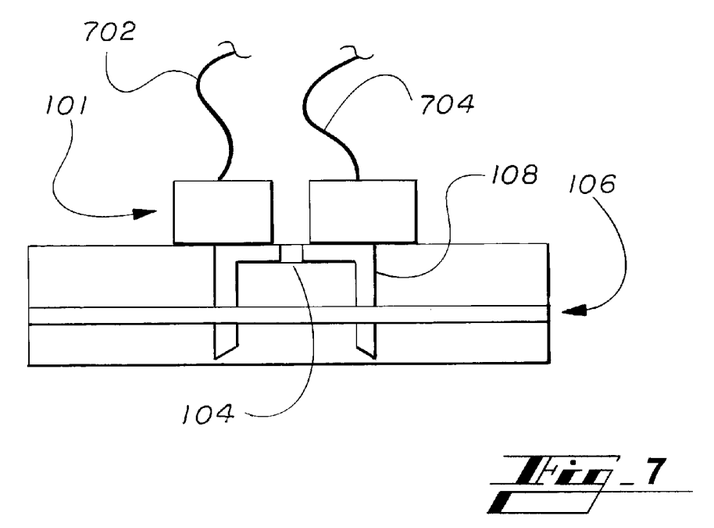
FIG. 7 is a cross-section showing the system and workpieces, of FIG. 1, at a still further stage of processing.

No matter how the connector is provided in the first workpiece, the connector can be further pierced into the second workpiece—e.g., at least lower tips of the connector 108 as shown in FIG. 7. In one embodiment, this piercing is performed while welding energy (e.g., HF ultrasonic vibrations), and force (compression force), are being applied, by a welding tool, to the connector. The energy causes the second workpiece to melt adjacent tips of the connector, facilitating the piercing of the connector into the second workpiece.

Figure 5:
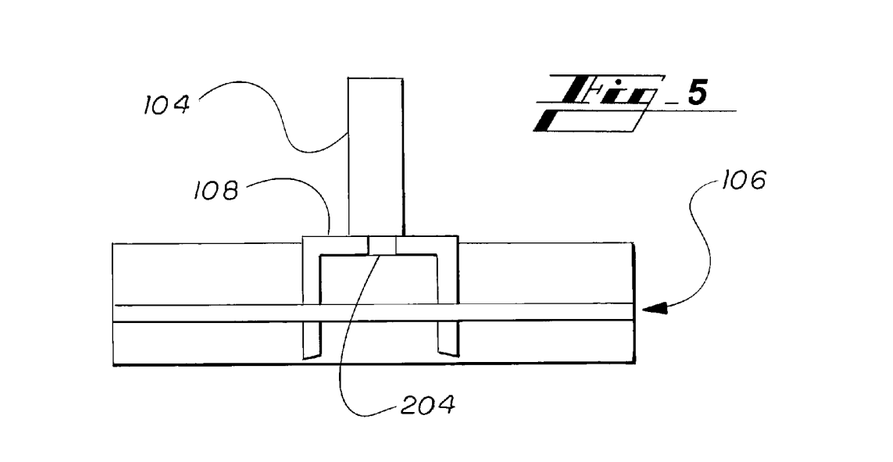
FIG. 5 is a cross-section showing the system and workpieces, of FIG. 1, at a subsequent stage of processing.

FIG. 5 illustrates an example scenario showing the workpieces after the conductive fluid has been applied (step 302) and the conductive connector (e.g., rivet) punched into place (step 304). As referenced above, and shown in the figure, the conductive connector is embedded into a first of the workpieces to at least a distance by which the connector reaches the conductive fluid.

In the embodiment shown in FIG. 5, the mechanical connector is sized, shaped, and pushed into the workpieces so that the connector not only extends through the first of the workpieces (the upper workpiece in the view of FIG. 5) and to the conductive fluid (e.g., ink 106), but also on into the second of the workpieces (the lower workpiece in FIG. 5).

Figure 6:
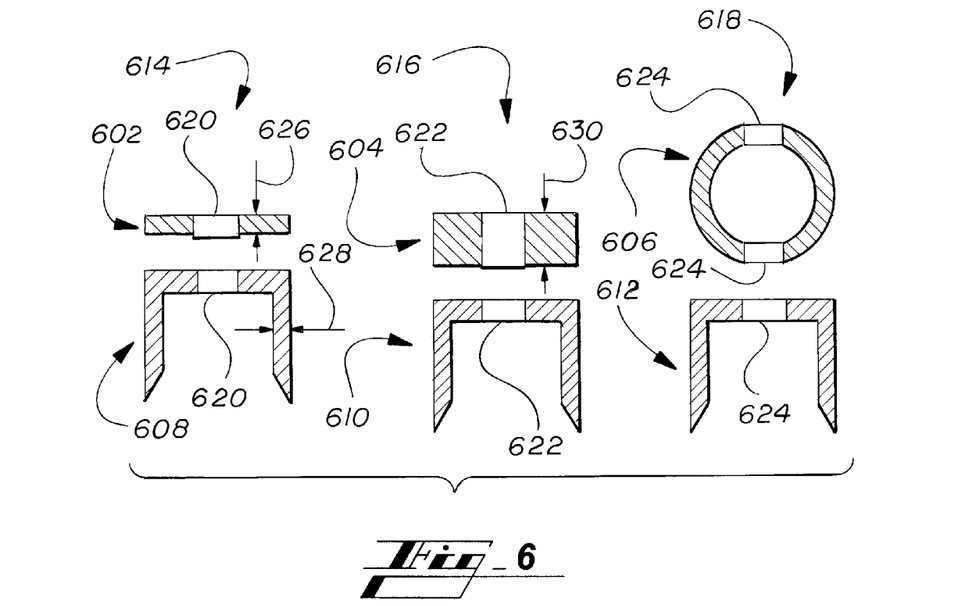
FIG. 6 illustrates example conductive connectors (e.g., staple rivets), according to embodiments of the present technology.

FIG. 6 shows top views 602, 604, 606 and side views 608, 610, 612 of three example connectors 614, 616, 618. Each connector includes an insulator 620, 622, 624.

Viewing only FIGS. 1, 5, and 6, the mechanical connector in FIGS. 1 and 5 can be any of the designs 614, 616, 618, the profile of the part in FIGS. 1 and 5 matching the profile 608, 610, 612 of each FIG. 6 design.

As can be seen by the top views 602, 604, 606 of FIG. 6, though the designs 614, 616, 618 have common profiles 608, 610, 612, each has a distinct three-dimensional shape. The first example connector 614 has a relatively thin depth, whereby a thickness 626 is about the same as a leg width 628.

The second example connector 616 is similar in shape to the first 614, but has more depth. The thickness 628 of the second connector 616 is about the same as the leg width.

The third example connector 618 has a circular top plan shape, as shown in FIG. 6. When this connector 618 is used, a spot weld will be formed.

With continued reference to the method 300, with the conductive fluid and conductive connector in place, flow proceeds to step 306, whereat the punch may be withdrawn from the conductive connector, and the electrode is positioned adjacent and in contact with the conductive connector if it has not already been positioned adjacent and in contact with the conductive connector.

In one embodiment, not shown expressly in the figures, the process is two-sided, whereby the connector is sized, shaped, and positioned to reach an outer surface (e.g., top surface in the figures) of the first workpiece and an opposite outer surface (e.g., bottom surface in the figures) of the second workpiece. In this embodiment, a welding system includes a first electrode for applying welding energy (e.g., electrical current) to the connector at the first location, at or adjacent the outer surface of one of the workpieces (e.g., the first workpiece, or the second workpiece). A second electrode is positioned adjacent the other of the workpieces (e.g., the second workpiece, or the first workpiece) for receiving the current from the first electrode.

An example of the arrangement at this point is shown in FIG. 7. FIG. 7 also shows connection to the electrode of one or more leads 702, 704, described further below.

At step 308, an electrical current is applied through the electrode to the arrangement including the workpieces (101) and conductive connector (108) and fluid (106). The current is applied form a first lead 702 into a first portion of the rivet (e.g., left side of the rivet 108 in FIG. 7), by way of a first (e.g., positive) electrode, and on to the conductive ink. The ink completes a circuit loop including a second portion of the rivet (e.g., right side of the rivet 108 in FIG. 7) leading up to a second (e.g., negative) electrode and the second lead 704.

The current passing through the rivet, ink, and workpieces produces joule heat in the rivet, ink, and eventually the workpieces adjacent the ink and rivet. The joule heat melts the workpieces at the joint, thereby joining the workpieces together.

Figure 8:
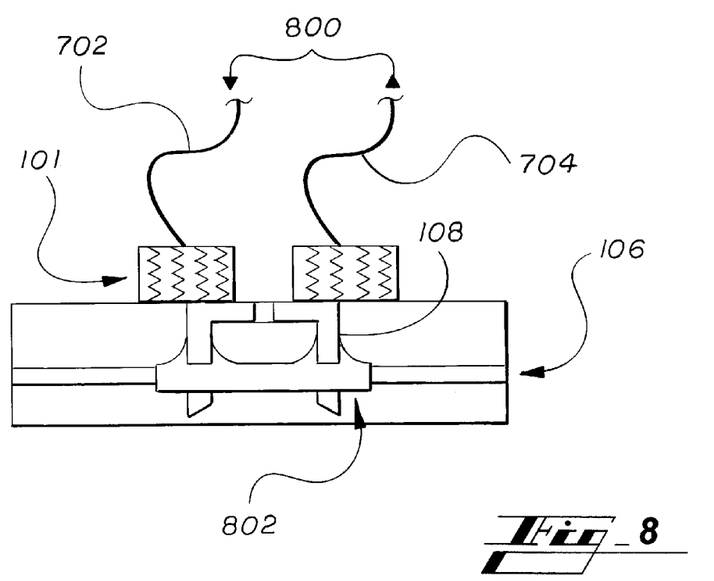
FIG. 8 is a cross-section showing the system and workpieces, of FIG. 1, at a still later stage of processing.

FIG. 8 shows this step 308 schematically. The visual indicates current path to and from the electrode by numeral 800.

The joule heat initiates a weld nugget between the workpieces.

FIG. 8 also shows the weld nugget 802. Generally, the weld 802 grows (e.g., from left (current in) to right (current out)) while the joule heat condition is being maintained, or until most or all of the inter-component areas are welded. Because the rivet will also heat, the workpieces will also melt some adjacent rivet portions through which current is passed, as shown.

Characteristics of the welding process are controlled as desired. For instance, a rate and extent of the welding are affected by a level of the current (e.g., voltage level) provided to the arrangement and electrode force applied to the workpieces. The rate and extent of the welding is also affected by size and shape of the conductive connector and of the workpieces. The welding rate and extent are further affected by an amount, type, and positioning of the conductive fluid. Still another relevant variable is an amount of time that the current is applied to the mechanical conductive element. In a contemplated embodiment, the current level applied to the arrangement varies during the process, such as by being ramped up to a peak and ramped back down.

Current is applied to the arrangement for much less time using the current technology compared to conventional ultrasonic techniques, which can have a cycle time of about twelve to twenty seconds or more. In one embodiment, the cycle time for the present technology is between about 0.1 and about five seconds. In another, the cycle time is between about five and about ten seconds. In one embodiment, the time is between about two and about eight seconds. In some implementations, other time ranges are used. A system may be designed to perform the weldings regularly as desired within a tighter window of time, for instance, such as with a window of one second. As an example, the system is in one embodiment configured to complete the weld satisfactorily with about two to three seconds of current application.

These and other relatively-short cycle times can be achieved as desired based on setting variables such as those described—e.g., voltage level, electrode force, shape of conductive connector, type and positioning of conductive fluid, etc.

With continued reference to the method 300 of FIG. 3, flow proceeds to step 310 whereat the weld has grown to a desired size and the electrode is retrieved. Because the electrode contacted the mechanical connector, instead of the first polymer workpiece itself, there is a very low likelihood, or no risk at all, of some of the workpiece material sticking undesirably to the electrode being withdrawn.

The method can end, or be repeated, such as in connection with other workpieces, as indicated by reference numeral 311.

While the technique outlined in the example method 300 of FIG. 3 can be referred to by other terminology, the technique can be referred to as hybrid rivet-resistance welding. The technique is a hybrid technique because it does not include applying resistance, solely, but also doing so through a rivet, and via conductive fluid, as taught above.

V. Multi-Connector/Multi-Electrode Embodiments

Figure 9:
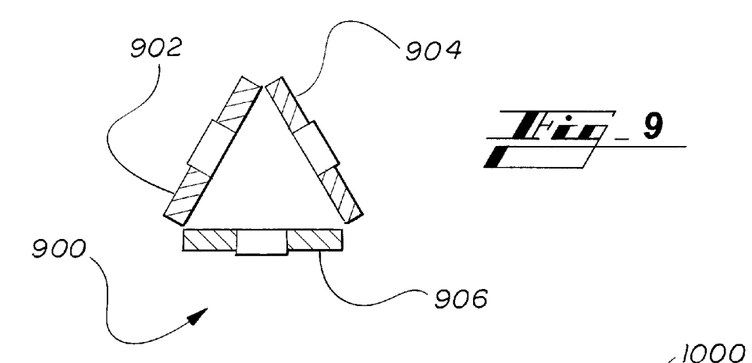
FIG. 9 illustrates an example arrangement of multiple mechanical conductive connectors for use together, according to an embodiment of the present technology.

FIG. 9 illustrates an example arrangement 900 of multiple mechanical conductive connectors 902, 904, 906 for use together, according to an embodiment of the present technology.

FIG. 9 shows a top, plan view of the connectors are shown inserted into the workpiece 101, like the insertion shown in the cross section of FIG. 5.

Each connector in this example can have a form like that referenced by numeral 602 in FIG. 6.

While three connectors 902, 904, 906, e.g., rivets, are shown, and forming a triangular shape, other numbers of connectors, forming any of a wide variety of shapes (e.g., circle, oval, square or other rectangles), can be used within the scope of the present teachings.

FIG. 10 illustrates an example electrode arrangement 1000 that can be used in combination with the connector arrangement of FIG. 9. The arrangement of FIG. 10 includes three electrodes 1002, 1004, 1006.

The three electrodes 1002, 1004, 1006 of FIG. 10 correspond to the three connectors 902, 904, 906 of FIG. 9. The electrodes 1002, 1004, 1006, more particularly, are sized, shaped, and positioned to contact and supply voltage to each of the connectors 902, 904, 906 selectively for forming the desired weld.

More particularly, for instance, current can be applied sequentially through various pairs of the electrodes 1002, 1004, 1006. Generally, the electrode pairs to which current is passed are those below and between which a mechanical connector 902, 904, 906 extends. For instance, connector 902 would be below and extending between electrodes 1002 and 1004, when the connectors are inserted into the workpiece 101 and the electrodes are positioned (like, e.g., FIGS. 7 and 8) for welding.

In the example of FIG. 10, current is first directed to pass between a first pair of the electrodes (e.g., electrodes 1002, and 1004) in an initial energizing step—i.e., through a first of the pair (e.g., 1002) into a first side (e.g., leg) of the connector 902, then creating the welding heat between the first side and a second side (e.g., leg) of the connector 902, creating a weld there between the sides (like the welding of FIG. 8), and then passing back up through the second side to the second electrode of the pair (e.g., 1004).

After current is directed to pass between the first pair of the electrodes (e.g., electrodes 1002, and 1004) in the initial energizing step, current is then passed, likewise, between a second pair of the electrodes (e.g., electrodes 1004, and 1006) in a subsequent energizing step, and then between a third pair of the electrodes (e.g., electrodes 1006, and 1002) in a still subsequent energizing step.

In one embodiment, the sequence described by way of example, including each pair of electrodes is performed once. In another, some or all of the electrode pairs are energized, as described, more than once.

FIG. 11 illustrates an example weld arrangement 1100 resulting from positioning and operation of the connector and electrode arrangements of FIGS. 9 and 10. More particularly, the welding 1100 has sides 1102, 1104, 1106 corresponding to the mechanical connectors 902, 904, 906.

VI. Select Features of the Technology

Some features of the technology are summarized below, and are simply examples, not exclusive of important features including advantages and benefits.

Advantages of the present technology include increasing accessibility, in the joining process, due to the one-side nature described. According to conventional two-sided techniques, a larger 'gun,' resistive machine, having two opposing electrodes, is required, and much more work space is needed to accommodate the same. Also, using single-sided resistance welding, there is no need to apply opposing forces to the workpieces being joined.

Still another benefit of the present technology is that many manufacturing facilities and infrastructure, e.g., tooling, already have resistance welding tooling, albeit for sport welding metal. This tooling can be leveraged for implementation the technology, thereby lowering cost of realization.

Yet another benefit includes the mechanical fastening function performed by the mechanical connector (e.g., rivet), including after the product (e.g., automobile) is manufactured and in use. While the welds are created to be robust and stand up over time, if there is a weld weakening for any reason over the life of the product, the mechanical connector functions as a support, or backup fastener. The function can be referred to as a peel-protection, or peel-stopping, function, as the rivet may contribute to keeping the connected workpieces from peeling away from each other. The connector can be referred to as a peel stopper, for example.

The advantages of the present technology still further include shortening cycle time required for joining multiple workpieces, such as fiber-reinforced polymer (FRP) composites in a stack-up arrangement. Improving cycle time would improve efficiency of product manufacturing, while maintaining or improving product quality.

VII. Conclusion

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the technology foci (e.g., claims) and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the technology foci (e.g., claims). All such variations, modifications, and combinations are included herein by the scope of this disclosure and the following technology foci (e.g., claims).

What is claimed:

1. A process, for joining workpieces using hybrid mechanical connector-resistance welding, comprising:
   introducing a conductive fluid to an interface between the workpieces;
   inserting at least one mechanical conductive connector into at least one of the workpieces so that the connector reaches the interface having the conductive fluid therein; and
   applying energy for welding to the at least one mechanical conductive connector so that the energy passes, through the connector, to the conductive fluid and heat is generated in the workpieces at the interface, thereby melting the workpieces and forming a weld joint connecting the workpieces.

2. The process of claim 1, wherein:
   the mechanical conductive connector is a rivet; and
   the rivet is shaped to form a generally annular top plan profile.

3. The process of claim 1, wherein:
   the mechanical conductive connector is a rivet; and
   the rivet includes an insulating spacer separating two poles, each of which is inserted to reach the conductive fluid.

4. The process of claim 1, wherein the inserting and the applying are performed using a combined punch-electrode tool.

5. The process of claim 4, wherein the tool includes an electrode sub-tool surrounding a central punch sub-tool.

6. The process of claim 5, wherein the electrode sub-tool includes at least one insulator separating a first electrode of the electrode sub-tool and a second electrode of the electrode sub-tool.

7. The process of claim 1, wherein:
   inserting the connector into at least one of the workpieces includes piercing the first workpiece with the connector; and
   the piercing is performed while welding energy, and force, are being applied, by a welding tool, to the connector, causing the first workpiece to melt adjacent tips of the connector, facilitating the piercing.

8. The process of claim 7, wherein:
   the piercing is performed using a punch device; and
   the punch device also functions as the weld-energy applicator.

9. The process of claim 1, wherein:
   positioning the connector in the first workpiece of the multiple workpieces to be joined includes positioning the connector partially within the first workpiece during a molding process for the first workpiece; and
   positioning the connector partially within the first workpiece includes implanting or embedding the connector into the first workpiece during compression molding.

10. The process of claim 1, wherein positioning the conductive mechanical connector in the first workpiece of the multiple workpieces to be joined includes positioning the connector partially within the first workpiece prior to a molding process for the first workpiece.

11. The process of claim 1, wherein positioning the conductive mechanical connector in the first workpiece of the multiple workpieces to be joined includes positioning the connector to at least a depth of the first workpiece adjacent an interface between the first workpiece and the second workpiece.

12. The process of claim 1, wherein:
the contact portion of the connector includes a generally flat head; and
the connector is positioned with respect to the first workpiece so that the head does not reach to or below the application surface of the first workpiece.

13. The process of claim 1, wherein
the contact portion of the connector includes a generally flat head; and
the connector remains with a product formed by the welding to perform at least a function of post-welding peel stopping.

14. The process of claim 1, wherein the mechanical conductive component is configured and provided in the first workpiece so that, following welding, the component acts as a heat sink, drawing heat from the weld formed, promoting quick hardening of the joint newly formed.

15. The process of claim 1, wherein:
the process further comprises contacting the mechanical conductive component with a weld-energy applicator prior to the welding; and
the workpiece material is not deposited on the applicator during the welding; and
the process further comprises withdrawing the applicator from the mechanical conductive component very soon post welding, without workpiece material being affixed to the applicator.

16. The process of claim 1, wherein applying the energy for welding to the at least one mechanical conductive connector includes applying an electrical current by a first electrode to the connector adjacent an outer surface of the first workpiece and positioning a second electrode in contact with the connector adjacent an outer surface of the second workpiece, allowing the input current to exit the workpieces via the connector and second electrode.

17. The process of claim 1, wherein applying the energy for welding to the at least one mechanical conductive connector includes applying an electrical current by a first electrode to the connector adjacent an outer surface of the second workpiece and positioning a second electrode in contact with the connector adjacent an outer surface of the first workpiece, allowing the input current to exit the workpieces via the connector and second electrode.

18. The process of claim 1, further comprising piercing the connector into the second workpiece while welding energy, and force, are being applied, by a welding tool, to the connector, causing the second workpiece to melt adjacent tips of the connector, facilitating the piercing into the second workpiece.

19. A process, for joining workpieces using hybrid mechanical connector-resistance welding, comprising:
inserting at least one mechanical conductive connector into at least one of the workpieces so that the connector reaches an interface between the workpieces having a conductive fluid at the interface; and
applying energy for welding to the at least one mechanical conductive connector so that the energy passes, through the connector, to the conductive fluid and heat is generated in the workpieces at the interface, thereby melting the workpieces and forming a weld joint connecting the workpieces;
wherein inserting the connector into at least one of the workpieces includes piercing the first workpiece with the connector; and
wherein the piercing is performed while welding energy, and force, are being applied, by a welding tool, to the connector, causing the first workpiece to melt adjacent tips of the connector, facilitating the piercing.

20. A process, for joining workpieces using hybrid mechanical connector-resistance welding, comprising:
inserting at least one mechanical conductive connector into at least one of the workpieces so that the connector reaches an interface between the workpieces having a conductive fluid at the interface; and
applying energy for welding to the at least one mechanical conductive connector so that the energy passes, through the connector, to the conductive fluid and heat is generated in the workpieces at the interface, thereby melting the workpieces and forming a weld joint connecting the workpieces.

* * * * *